United States Patent

Hirano et al.

[11] Patent Number: 6,106,965
[45] Date of Patent: *Aug. 22, 2000

[54] POLYMER ELECTROLYTE FUEL CELL

[75] Inventors: Shinichi Hirano, Yokohama; Futoshi Fujikawa, Tokyo, both of Japan

[73] Assignee: Mazda Motor Corporation, Hiroshima, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/831,009

[22] Filed: Mar. 31, 1997

[30] Foreign Application Priority Data

Mar. 29, 1996 [JP] Japan ................................. 8-077014
Mar. 29, 1996 [JP] Japan ................................. 8-077015

[51] Int. Cl.$^7$ ..................................................... H01M 8/10
[52] U.S. Cl. .............................. 429/30; 429/40; 429/41; 429/44; 429/45
[58] Field of Search ........................ 429/30, 41, 44, 429/40, 45

[56] References Cited

U.S. PATENT DOCUMENTS 5,234,777  8/1993  Wilson ........................................ 429/33
5,677,074  10/1997 Serpico et al. .............................. 429/43
5,716,664  2/1998  Marchetti ................................... 429/42

FOREIGN PATENT DOCUMENTS

59-127374  7/1984  Japan .
7-057738A  3/1995  Japan .
7-134995A  5/1995  Japan .

*Primary Examiner*—Laura Weiner
*Attorney, Agent, or Firm*—Martin Fleit

[57] ABSTRACT

A solid polymer electrolyte fuel cell including a solid polymer electrolyte membrane, an anode side electrocatalyst electrode provided at one side of the polymer electrolyte membrane and an cathode side electrocatalyst electrode provided at the other side of the polymer, a membrane-like electrocatalyst layer permitting mass transfer therethrough provided at a boundary surface of an electrocatalyst layer for an oxygen reduction reaction in the polymer electrolyte membrane in the cathode side electrocatalyst electrode, and the membrane-like electrocatalyst layer including an electrocatalyst substance. A power generation efficiency can be remarkably improved with a simply structure and advantageous cost performance in the field of a solid polymer electrolyte fuel cell.

17 Claims, 5 Drawing Sheets

| | SPUTTER MEMBRANE | CATALYST LAYER |
|---|---|---|
| Pt/C (%) | 20+SPUTTER | 20 |
| Pt (mg/cm$^2$) | 0.10 | 0.35 |
| C (mg/cm$^2$) | 0.2 | 1.4 |
| PTFE (mg/cm$^2$) | 0.2 | 0.9 |
| Nafion (mg/cm$^2$) | 0.1 | 0.5 |
| THICKNESS ($\mu$m) | 5 | 35 |

POLYMER ELECTROLYTE FUEL CELL

BACKGROUND OF THE INVENTION

1. Field of the Invention

The present invention relates to an electrolytic membrane fuel cell, in particular to a structure of the electrolytic membrane fuel cell.

2. Related Art

A fuel cell or electrochemical cell, which generates an electric power by virtue of an oxidation/reduction reaction through an electrolyte, is utilized for various applications. For this purpose, electrodes are disposed at opposite sides of such electrolyte and a reactive gas are introduced thereto to generate the electric power. As a configuration of the fuel cell, a polymer electrolyte fuel cell(PEFC) or a solid PEFC has been known. Generally, the solid polymer electrolyte fuel cell is formed by laminating a power generating element or solid polymer electrode bonded assembly in which a solid polymer electrolyte membrane with hydrogen ion conductivity is sandwiched between a pair of platinum (Pt) electrode catalyst deposition carbon electrodes and gas separators which are disposed at opposite sides of the bonded assembly for supporting the assembly, and are formed with grooves to which the reactive gas is supplied. With this structure, a fuel gas is introduced to one of the electrodes and an oxidant gas is introduced to the other electrode so that an electrochemical energy due to the fuel gas and oxidant gas is directly converted to an electric energy to obtain the electric energy.

In the solid polymer electrolyte fuel cell, when an electrochemical reaction occurs between the hydrogen and oxygen, an electrical current is generated between the electrodes while water is produced as by-product in the cathode. The operative temperature of the solid polymer electrolyte fuel cell is as low as about 80° C. compared with other types of fuel cells. Thus, the polymer electrolyte fuel cell is suitable for a portable power source, specifically, a power source for electric automobile.

However, it should be noted that the automobile is necessary to find a supply source of the hydrogen gas as a fuel gas in its own facility, such as a portable tank, reformer or the like. On the other hand, an ambient air is used as the oxidant gas by reason of weight, cost of the system and the like. In this case, since the air is of one-fifth oxygen density of a pure oxygen, a problem occurs in terms of an oxidation/reduction reaction speed, and mass transfer speed during the reaction in the fuel cell.

In view of the above problem, the air is generally compressed to be introduced to the fuel cell. It should, however, be understood that an energy efficiency in the fuel cell as whole is lowered because it cannot help consuming a certain amount of energy for driving an air compressor.

Under the circumstances, various ways have been proposed that an enhanced energy efficiency can be accomplished under a low partial pressure of oxygen.

For example, it has been known that an electrocatalyst substance (usually a platinum which is active for the oxidation/reduction reaction under a low temperature condition as low as 80° C.) is atomized to improve an electrocatalyst activity, that the electrocatalyst substance is carried by a corrosion resistant carbon to improve a catalyst adsorption, that a platinum sputtering deposition is made in order to concentrate anode gas, cathode gas in a three boundary phase area among ion conductor, electrocatalyst and reactive gas to thereby improve the electrocatalyst activity, and the like.

In this case, the platinum sputtering deposition is made on a surface of the electrocatalyst layer so that a surface area of the electrocatalyst for exerting the electrochemical property thereof is increased to improve the oxygen reduction reaction (ORR) kinetics.

It should, however, be noted that there are problems in making the platinum sputtering deposition as follows. Namely, the platinum sputtering deposition formed on the surface of the polymer electrolyte membrane of the electrode covers a surface of the electrocatalyst to impede a transfer of water and the like resulting in degradation of the energy efficiency of the fuel cell as a whole.

Japanese Un-examined Patent publication No. 7-134995 discloses that water produced around the cathode is effectively removed to improve fuel cell performance. In the above publication, the fuel cell includes a solid polymer electrolyte membrane and a fuel electrode and air electrode disposed at opposite sides of the electrolyte membrane. An electrocatalyst layer of the air electrode includes carbon particles with hydrophobic surface and electrocatalyst carried by the carbon particles. An electrocatalyst layer of the fuel electrode includes carbon particles with hydrophilic surface and electrocatalyst carried by the carbon particles. The above publication states that with this structure, both problems of a flooding of the by-product water around the air electrode and water shortage in the electrolyte close to the fuel electrode can be eliminated.

The above Japanese publication No. 7-134995 provides a fuel cell structure which can effectively control the supply and discharge of the water around the anode and cathode. Thus, this type of fuel cell can improve the fuel cell performance in terms of mass transfer in the cell. However, this does not take totally account of both the electrocatalyst activity and mass transfer. Therefore, there is a certain limit in improvement for the fuel cell performance.

SUMMARY OF THE INVENTION

It is therefore an object of the present invention to provide an electrode structure of a fuel cell which can improve a cell performance with advantageous cost performance.

The above and other objects of the present invention can be accomplished by a solid polymer electrolyte fuel cell comprising a solid polymer electrolyte membrane, an anode side electrocatalyst electrode provided at one side of the polymer electrolyte membrane and an cathode side electrocatalyst electrode provided at the other side of the polymer, a membrane-like electrocatalyst layer permitting mass transfer therethrough provided at a boundary surface of an electrocatalyst layer for an oxygen reduction reaction in the polymer electrolyte membrane in the cathode side electrocatalyst electrode, and the membrane-like electrocatalyst layer including an electrocatalyst substance. The electrocatalyst membrane layer preferably includes platinum as the electrocatalyst. The membrane-like electrocatalyst layer can be formed by utilizing sputtering, depositing, non-equilibrium process of the platinum, platinum alloy, composite material of platinum and carbon as a carrier thereof and the like.

The term "permitting mass transfer" means functioning as a vehicle capable of transferring mass, such as reactive gas, proton $H^+$, moisture as a reaction vehicle, produced water and the line and does not mean any membrane formed by a uniform metal structure.

Preferably, a thickness of the electrocatalyst layer is smaller than 1 micro meter.

One embodiment of the membrane-like catalyst layer is a membrane-like electrocatalyst layer loaded with a platinum sputter-deposition formed by a direct or alternate current sputtering. It is preferred that the platinum content is about 0.01–0.1 mg/cm$^2$ in the electrocatalyst layer. Further, preferably, the platinum content ranges from 10 to 60 weight % of the carbon black, namely the catalyst carrier. The electrocatalyst layer is preferably formed by a composite sputtering membrane including the platinum as a catalyst material and hydrophilic material such as carbon black by means of a direct or alternate current, in particular, radio sputtering. In addition, the electrocatalyst layer can be constituted by a platinum loading alloy sputtering membrane formed by sputtering.

An electrode reaction of the fuel cell occurs within the electrocatalyst layers at opposite sides of the electrolyte membrane. As the reaction is active, the energy generated in the fuel cell is increased, or the fuel cell performance is improved. However, the electric current generated due to the electrochemical reaction in the electrodes is not uniform in a thick direction of the electrocatalyst, specifically, the reaction activity is enhanced as close to the boundary of the electrolyte membrane as possible. As being away from the boundary, the reaction activity is lowered.

The present invention is made taking account of this phenomenon so that more active reaction is facilitated in the electrocatalyst layer close to the boundary of the electrocatalyst membrane where the electrode reaction is most activated. Namely, a membrane-like electrocatalyst layer permitting mass transfer having a high catalyst material density is formed close to the electrolyte membrane of the electrocatalyst layer for facilitating the electrode reaction.

In a preferred embodiment, a high ion conductor density is provided corresponding to the formation of the high catalyst density electrocatalyst layer. With this structure, a bonding action of the proton H$^+$ migrated from anode to cathode through the electrolyte membrane, electron supplied to the cathode electrode after collecting in the anode and then doing external work through an external circuit, and oxygen supplied to the cathode electrode is efficiently performed. According to the present invention, a high oxidation/reduction reaction speed can be maintained while a resistance against the mass transfer through the electrolyte membrane of the fuel cell, the catalyst layers and diffusion layers can be suppressed as low as possible.

The electrocatalyst substance includes typically platinum and platinum alloy (Pt/Cr, Pt/Co, Pt/Rh, Pt/Ni) and the like. The electrocatalyst material is carried by a catalyst carrier or carbon black processed by a salt reduction method to have conductivity and anti-corrosion property for the application. The electrocatalyst substance density is regulated by changing the weight ratio between the catalyst substance and the carrier. In order to forme the membrane-like electrocatalyst, it is preferable to employ a composite material such as platinum carrying carbon black combining platinum or catalyst substance and hydrophilic material. By combining the hydrophilic material with the platinum, it is advantageous that an improved mass transfer property can be readily accomplished. In forming the membrane-like electrocatalyst layer, typically, electrocatalyst substance, electrocatalyst containing alloy, or electrocatalyst substance -hydrophilic material composite as above enumerated above are employed to form a electrocatalyst sputter loading membrane less than about 1 micro meter thickness on a normal electrocatalyst surface by means of sputtering. The platinum density in the electrocatalyst sputter loading membrane is about greater than 0.01 mg/cm$^2$, preferably, ranges from about 0.03 to 0.07 mg/cm$^2$. The reason why the electrocatalyst sputter loading membrane is smaller than 1 micro meter in thickness is that a thick sputtering of the electrocatalyst substance results in a remarkable drawback on the mass transfer characteristics as well as an undue increase of the cost amount of the platinum. The ion conductor includes fluoroplastics with sulfonic group.

In another aspect of the present invention, the membrane-like electrocatalyst layer including an electrocatalyst substance wherein the electrocatalyst substance is carried by activated carbon black with micro-pore structure having effective diameter of about 10–100 angstrom on its surface portion. For this purpose, the carbon black is subjected to an activating treatment in which the carbon black is typically processed with either alkali or steam to increase a specific surface thereof about 2–3 times. With this treatment, each of the carbon particles is formed with numerous micro-pores having effective diameters of about 10–100 angstrom on its surface portion. Any activating process may be employed for activating the carbon black for the present invention as far as it can increase the specific surface area of the carbon black effectively. The platinum loading electrocatalyst substance is effectively carried by the activated carbon black carrier formed on its surface portion with the micro-pore structure or with numerous micro-pores having an effective diameter of about 10–100 angstrom so as to improve remarkably the catalyst activity. Typically, the following combinations of catalyst and carrier are included for the purpose of the present invention but not limited thereto; platinum-activated carbon black, platinum alloy-activated carbon black, platinum carbon black composite-activated carbon black, or platinum containing alloy carbon black composite-activated carbon black.

Further objects, features and advantages of the present invention will become apparent from the Detailed Description of Preferred Embodiments which follows when read in light of the accompanying Figures.

DETAILED DESCRIPTION OF THE PREFERRED EMBODIMENTS

Figure 1:
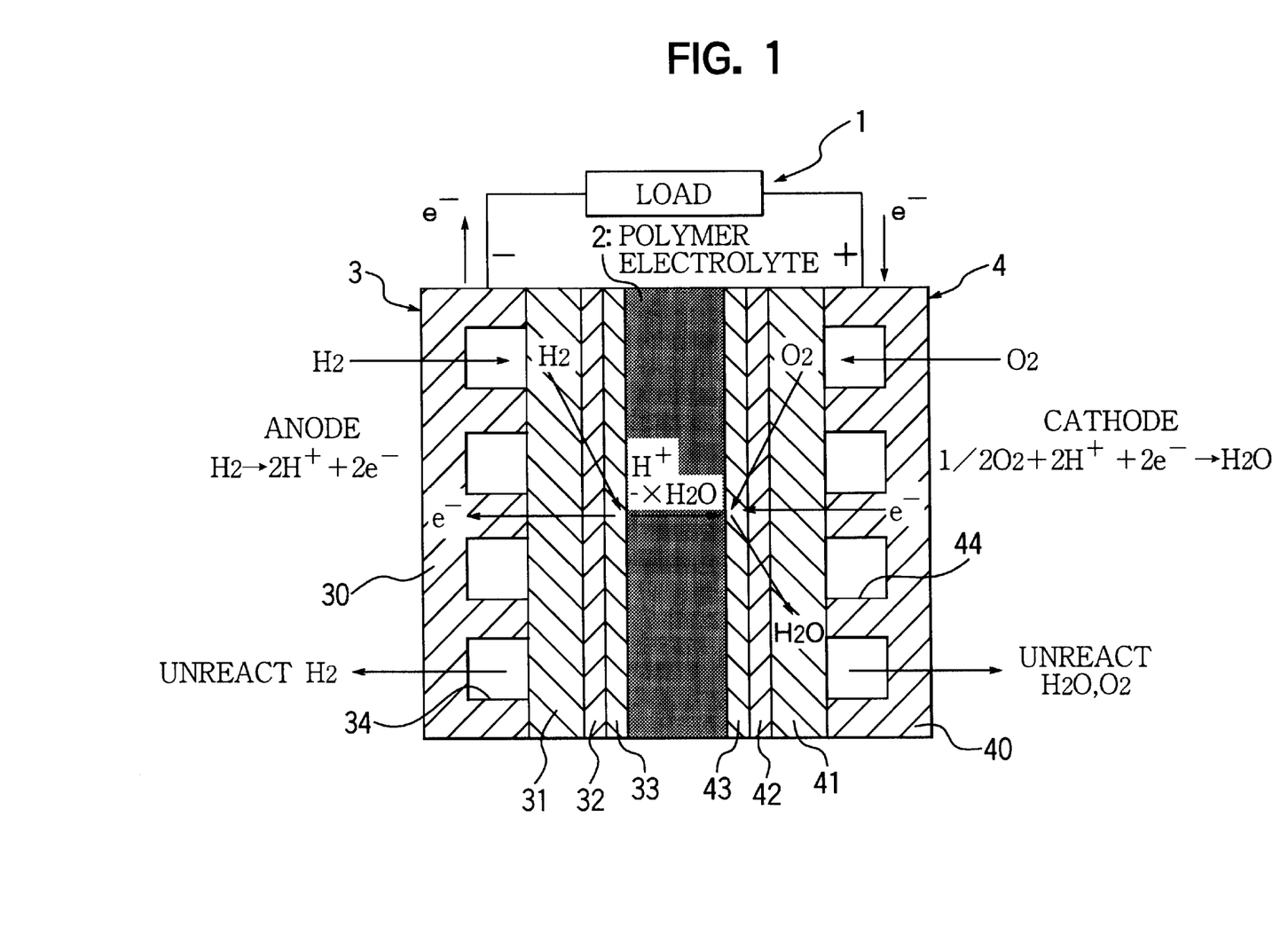
FIG. 1 is a schematic sectional view of an electrode bonded assembly of a solid polymer fuel cell in accordance with a preferred embodiment of the present invention.

Hereinafter, the present invention is described in detail taking reference with the attached drawings.
(Solid Polymer Electrolyte Membrane Electrode Bonded Assembly)
Whole Structure FIG. 1 is a schematic sectional view of a single solid polymer electrolyte membrane electrode bonded assembly of a preferred embodiment of the present invention.

The illustrated fuel cell 1 is basically provided with a solid polymer electrolyte membrane 2 in the middle, an oxidation or anode electrode 3 at one side thereof to which a hydrogen as a fuel gas is supplied and a reduction or cathode electrode 4 at the other side to which an air as an oxygen source is supplied.

The anode electrode 3 is constituted by laminating and bonding a carbon cloth 31, a diffusion layer 32 inside thereof, and an electrocatalyst layer 33 inside thereof. Outside of the anode electrode 3 is disposed a grooved gas separator 30 which separates gas and collects an electric power generated. The grooved gas separator 30 is provided with grooves about 1 mm in depth for defining anode gas passage 34 in which the hydrogen gas as a fuel gas is circulated while supplying proton $H^+$ to the electrolyte membrane.

The anode electrode 3 and the grooved gas separator 30 constitute an anode electrode bonded assembly. A surface contact portion of the carbon cloth 31 and the diffusion layer 32 constitute a power collecting section for collecting electrons generated from the hydrogen molecules.

The cathode electrode structure 4 is similar to the anode electrode 3, provided with a carbon cloth 41, diffusion layer 42 and electrocatalyst layer 43 to form a laminated and bonded structure. Outside of the carbon cloth 41 is provided a grooved gas separator 40 which prevents the oxygen from leaking out and separates winding or zigzag gas passages defined by the grooves and the surface of the carbon cloth from each other for preventing the gas from shortcutting the passages. The grooved gas separator 40 is formed with grooves defining cathode gas passages 44 for circulating the oxygen which is brought into contact with proton $H^+$ from the electrolyte membrane. The cathode electrode 4 is combined with the grooved gas separator 40 to constitute the cathode electrode bonded assembly.

As illustratively shown in FIG. 1, the proton $H^+$ migrated from anode to cathode through the electrolyte membrane is bonded with the electron supplied to the cathode electrode 4 after collecting in the anode and then doing external work through an external circuit in the vicinity of the cathode electrode 4. In the anode electrode, the protons $H^+$ are produced by removing the electrons from hydrogen molecules and in the cathode electrode, the protons $H^+$ through the membrane 2 is bonded with the electrons from the external circuit with an external load, and the oxygen supplied from the cathode gas passages to produce water molecules.

Figure 2:
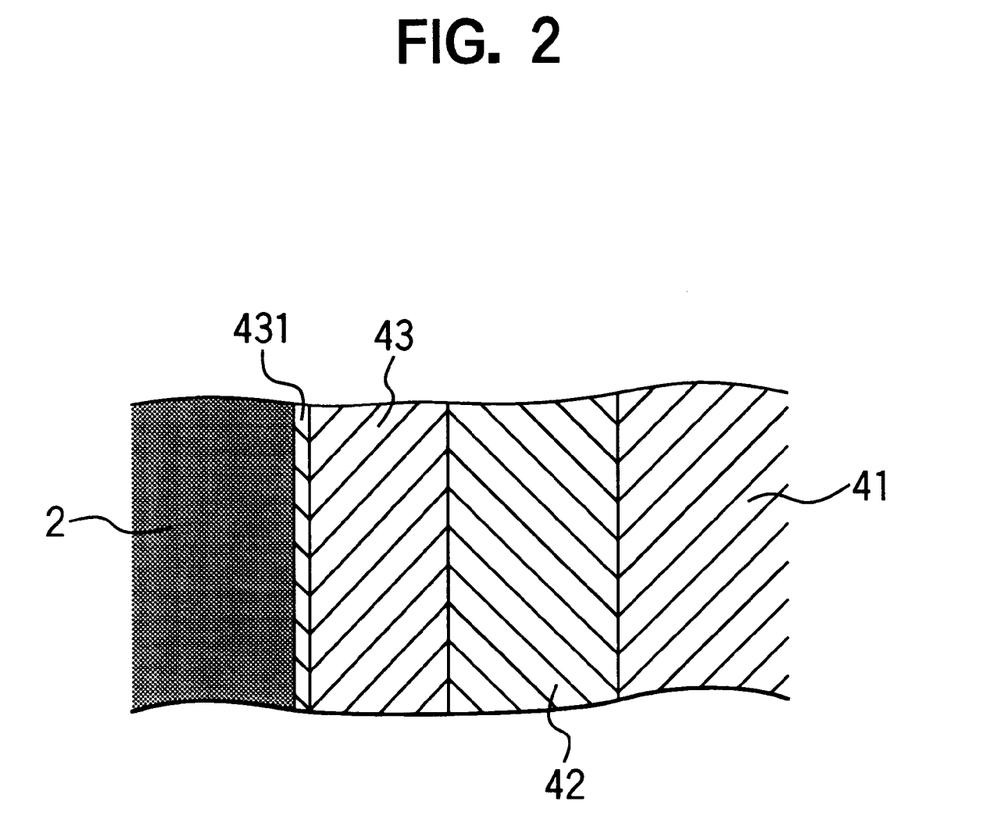
FIG. 2 is a sectional view showing laminated condition of each of layers of the fuel cell in FIG. 1.

FIG. 2 shows the details of the lamination from the electrolyte membrane 2 to the cathode electrode 4 wherein outside of the electrolyte membrane 2 is disposed an electrocatalyst layer 43, and between the electrolyte membrane 2 and the electrocatalyst layer 43 is formed a platinum-carbon black composite sputtered membrane 431. Outside the electrocatalyst 43 is disposed a diffusion layer 42 and a carbon cloth 41 outside thereof.

Carbon Cloth

The carbon cloths 31 and 41 are disposed just in side of the gas separators 30, 40 and constitute base layers of the electrode portions to serve as a power collecting member for carrying the electrons for the anode electrode reaction and cathode reaction. It is desirable that the carbon cloths 31 and 41 can facilitate the mass transfer in the electrodes 3 and 4 in particular, can supply effectively anode gas and cathode gas to a three boundary phase reaction area constituted by the ion conductor, electrocatalyst substance, and reactive gas, and can effectively remove the water produced in the cathode electrode 4.

In this embodiment, the carbon cloths 31, 41 are formed by weaving a carbon resin. The carbon cloth as illustrated is "A" Cloth (trade name) available from E-TEK Inc. U.S. The cloth has 116 $g/m^2$ in unit weight, about 0.35 in thickness. In preparing the electrode, the carbon cloth is subjected to surface treatment with fluoroplastics solution (polytetrafluoroethylene (PTFE) dispersed solution (PTFE of about 0.2 m in size is included by about 54–55 weight % and stably dispersed with surface active agent) available from Mitsui-Dupon Fluorochemical as trade name TEFLON FEP120-J) to provide water repellency.

In this treatment for providing water repellency, the carbon cloth is dipped in a solution prepared in a predetermined process for 5 minutes. The solution is prepared in a process that PTFE with the surface active agent is dispersed and diluted with deionized water to be 49 weight % of PTFE.

Then, excessive solution is wiped out from the surface of the carbon cloth. Thereafter, the carbon cloth is sintered in an electric furnace with nitrogen atmosphere at about 340° C. for about 1 hour.

Diffusion Layer

The diffusion layer is disposed inside of the carbon cloth to be brought into contact with the electrocatalyst layer. The diffusion layer is expected to provide an efficient mass transfer to and from the electrocatalyst layer as well as the electrode. The diffusion layer is also expected to collect efficiently a generated electric power as a vehicle between the electrocatalyst and the electrode. In the illustrated embodiment, the diffusion layer is constituted by a sintered material of the carbon black and PTFE. The weight ratio of the carbon black and PTFE is 6:4 or they are included by 2.4 $mg/cm^2$ and 1.6 $mg/cm^2$ respectively in the diffusion layer. As a carbon black, a trade name, Vulcan XC-72(specific surface area about 250 $m^2/g$) available from Cabot Corporation is used.

Preparation of Diffusion Layer

The carbon black 315 mg and the above commercially available PTFE dispersed solution 389 mg were mixed with pure water 40 ml and isopropanol 40 ml and dispersed uniformly by means of ultrasonic cleaner. The dispersed and prepared solution was sprayed on the carbon cloth, which was subjected to the water repellent treatment as aforementioned as an electrode, while drying using a dryer. About 5–30% of the sprayed dispersed solution remained on the carbon cloth. After spraying, the carbon cloth on which the diffusion layer was formed was compressed by about 50 kg roller to about 0.2–0.5 mm in thickness. Next, the compressed material was introduced in the electric furnace with a nitrogen atmosphere and treated at 350° C. for 1 hour to sinter the PTFE to thereby form the diffusion layer on the carbon cloth.

Catalyst Layer (Cathode Electrode)

In the illustrated embodiment, the catalyst layer of the cathode electrode has about 40 $\mu$m in thickness as a whole. The surface of the catalyst layer 43 facing the electrolyte membrane 2 was formed with a platinum loading carbon-black sputtered membrane 431 by means of sputtering. The sputtered membrane has substantially not more than 1 micro meter in thickness. It should, however, be noted that the surface portion of the catalyst layer is porous so that a portion of the catalyst layer affected by the sputtering, in other words, a portion of the catalyst layer in which the platinum loading carbon black is bonded ranges about 5 $\mu$m in depth. Thus, in the illustrated embodiment, the sputtered membrane range is about 5 $\mu$m. As a result, the thickness of the electrocatalyst layer (20 weight % Pt/C) is about 35 $\mu$m in total. Mean size of the platinum in the electrocatalyst layer is about 2.5 nm.

Figure 3:
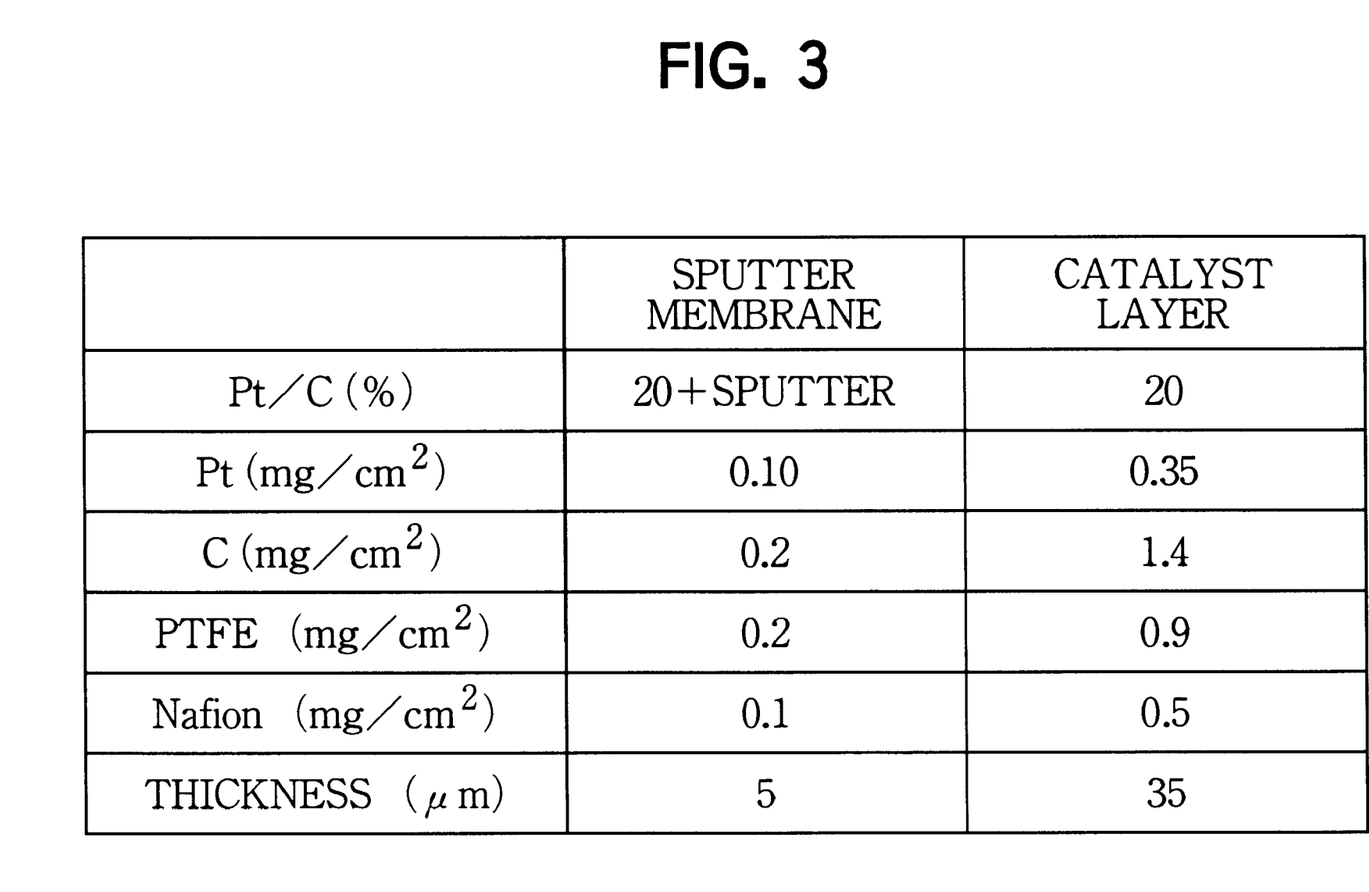
FIG. 3 is a graphical representation of the composition of cathode side catalyst layer.

The particulars of the electrocatalyst layer and sputtered membrane are shown in FIG. 3.

Figure 4:
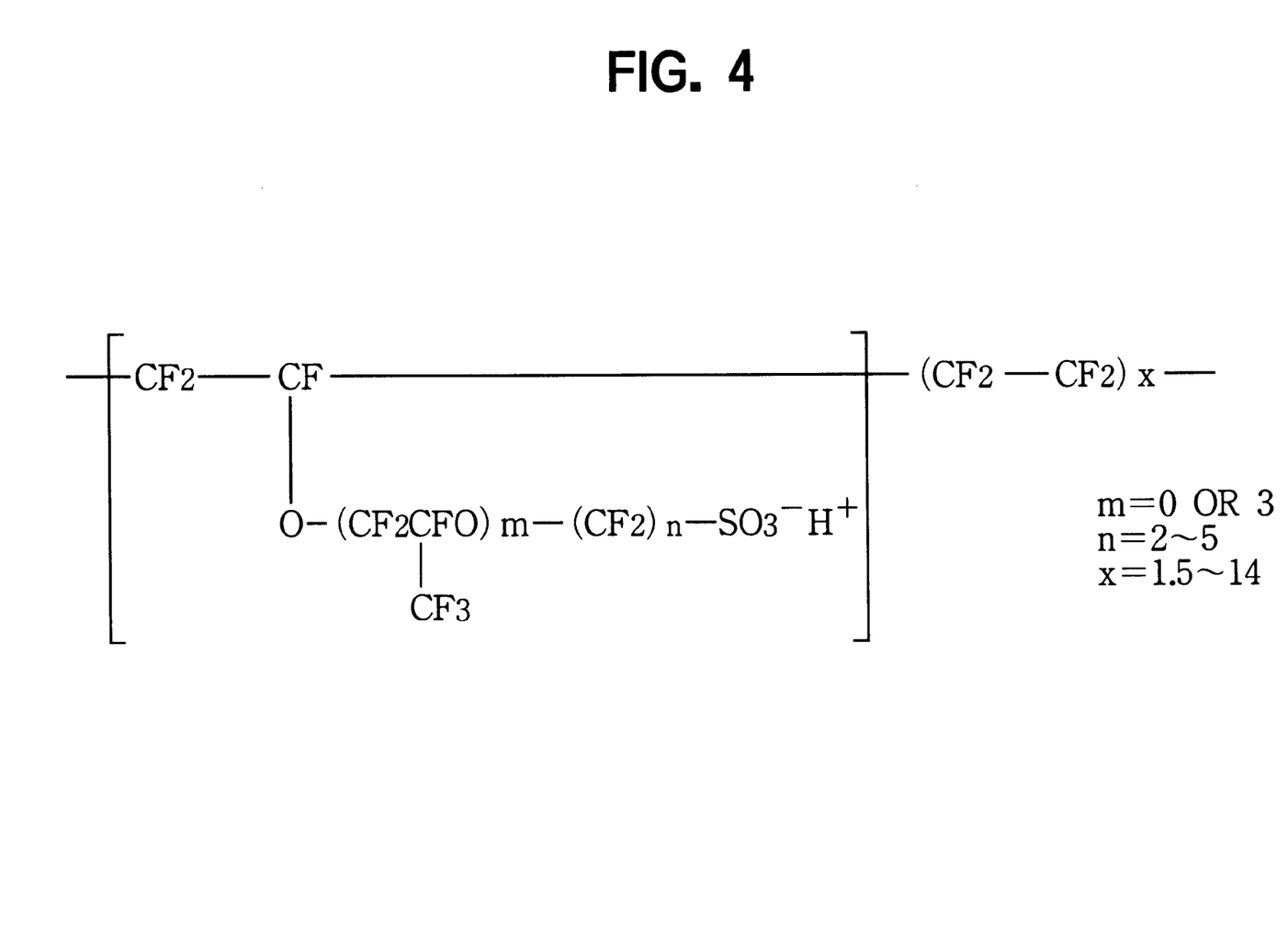
FIG. 4 is a view showing an example of a chemical structure of PTFE constituting an ion conductor.
Figure 5:
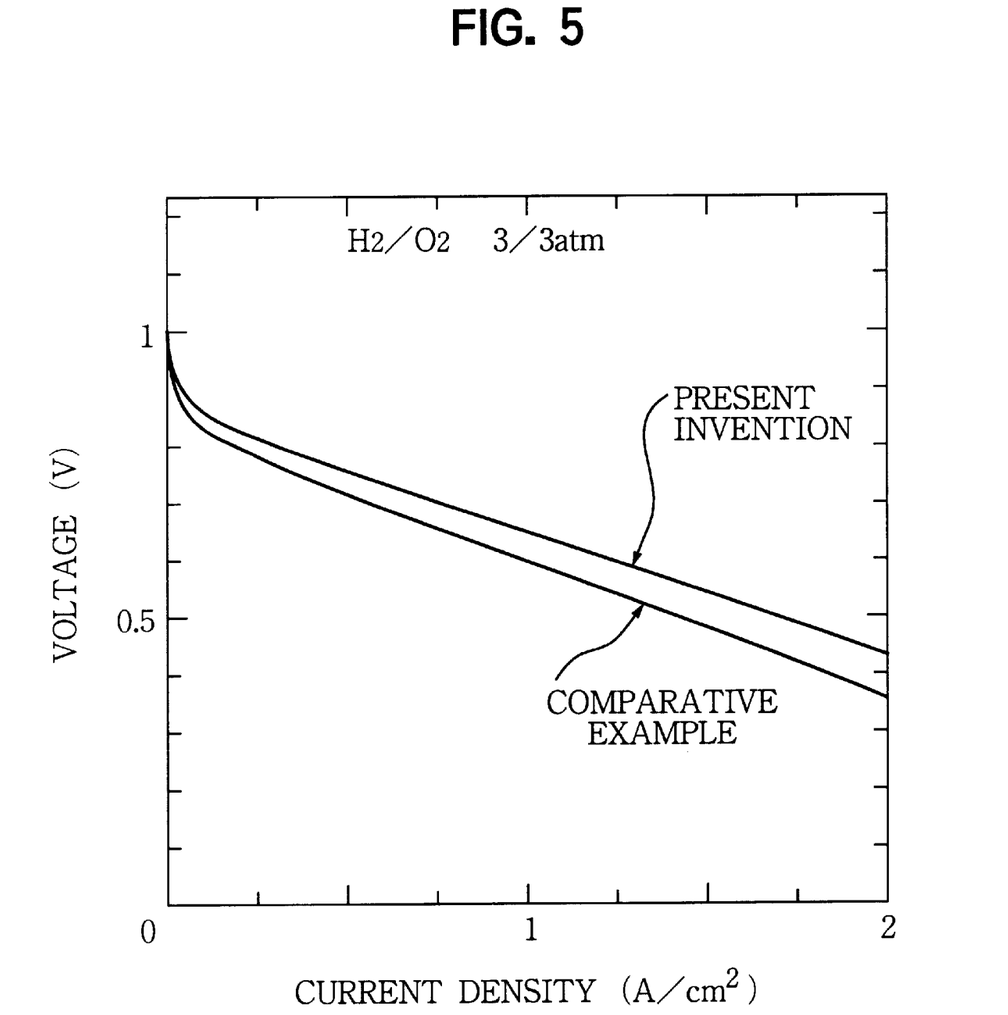
FIG. 5 is a graphical representation showing a relationship between a voltage and current density which shows characteristics of a fuel cell.

In FIG. 3, Nafion is a polymer containing solution and a trade name of an electrolyte membrane commercially available from Dupon. The polymer structure of Nafion is a similar to Acplex-S(1004) trade name which is available from Asahi Kasei incorporated as shown in FIG. 4. The Nafion or polymer containing solution is prepared by dispersing a predetermined amount of the polymer in a solution which is prepared by mixing water with ethanol with the same amount. In this embodiment, a polymer concentration is 5 weight %.

Hereinafter, the preparation of the cathode electrode is explained.

In preparing the electrocatalyst layer, first, a material dispersed solution including a predetermined material is prepared. As for the electrocatalyst 43, a platinum loading carbon black (20 weight % Pt/C) 160 mg was mixed with PTFE dispersed solution including 55 weight % PTFE (TEFLON FEP120-J) 158 mg. This mixture was mixed with pure water 40 ml and isopropanol 40 ml and dispersed uniformly by means of ultrasonic cleaner. PTFE with about 0.2 $\mu$m of mean size is included in the dispersed solution and stably dispersed together with a surface active agent therein. Next, the solution was sprayed on the semi-fabricated product, on which the diffusion layer is formed, to form the electrocatalyst layer 43. Then, as well as the formation of the diffusion layer, the material was introduced in the electric furnace with a nitrogen atmosphere and treated at around glass transition temperature of PTFE (about 300–350° C.) for 1 hour to sinter the PTFE to thereby form the electrocatalyst layer. Next, sputtering was applied on a surface portion of the diffusion layer-carbon cloth bonded assembly, on which the electrocatalyst 43 is formed, using a platinum loading carbon composite material so as to form a sputtered membrane. In this case, the sputtering was done under a low pressure argon atmosphere (2.7 Pa), with 1.8 kV of acceleration voltage and 80 mA of plate current level. In this case, a deposition speed of the sputtering material was about 0.3 g/cm$^2$/s. Final amount of the platinum in the sputtered membrane was about 0.05 mg/cm$^2$. The amount of carbon in the sputtered membrane was substantially the same as the platinum in terms of a ratio of the number of atoms. Next, the above polymer electrolyte solution Nafion was applied on the surface of the sputtered membrane of the semi-fabricated product for the solid polymer electrolyte electrode bonded assembly constituted by the carbon cloth 41, diffusion layer 42 on the carbon cloth 41 and the electrocatalyst layer 43 thereon. In this embodiment, Nafion is impregnated in a brush and applied on the sputtered membrane 431 with the brush. The amount of the application was about 0.6 mg/cm$^2$.

(Anode Electrode)

In the illustrated embodiment, the electrocatalyst layer of the anode electrode is formed by a single layer with a uniform catalyst density. The PTFE dispersed solution was sprayed on the surface of the diffusion layer to deposit the platinum loading (20 weight % Pt/C, mean platinum size 2.5 nm) carbon black (Vulcan XC-72) by about 0.4 mg/cm$^2$ and thereafter the semi-fabricated product was subjected to the sintering process of PTFE to form the electrocatalyst layer as the same process as the electrocatalyst layer as aforementioned in connection with the cathode electrode.

In this case, the level of the carbon black included in the electrocatalyst layer and diffusion layer in total was controlled to be about 4.0 mg/cm$^2$. The thickness of the anode electrode bonded assembly as a whole is about 0.35 mm.

Electrolyte Membrane

The solid polymer electrolyte membrane is of a nonporous polymer material, typically constituted by a fluoroplastics (polytetrafluoroethylene(PTFE)). In the illustrated embodiment, the membrane is constituted by Aciplex-S (1004), trade name, available from Asahi Kasei incorporated (Japan). The thickness of the membrane is about 2–6 mil (about 50–150 micro meter).

The chemical structure thereof is shown in FIG. 4.

As aforementioned, in a basic mechanism of the solid polymer fuel cell, electrons are removed from hydrogen molecules as a fuel gas in the anode electrode so that hydrogen ions(protons) H$^+$ and electrons are produced. The electrons reach the cathode electrode through a load. On the other hand, protons H$^+$ reach the cathode electrode through the electrolyte membrane 2. In the cathode electrode, the protons H$^+$ react the oxygen atoms to produce water. As understood from the above, the electrolyte membrane serves as a vehicle for conducting the protons H$^+$ to the cathode electrode while preventing unreacted hydrogen gas from reaching the cathode electrode as molecules. In this case, the protons H$^+$ migrate toward the cathode electrode together with water molecules. Therefore, the electrolyte membrane is necessary to retain a certain amount of water. It is desirable that ion conductor group, (in the illustrated embodiment, a sulfonic group in the membrane) is included by about 500–1500 g/equivalent weight. As a electrolyte membrane, any material can be used provided that (1) a function for carrying the protons H$^+$, (2) separating function for separating hydrogen in the anode gas passage from oxygen (air) in the cathode gas passage, and (3) function for retaining a certain amount of water.

It would be understood that the anode side electrocatalyst layer is formed in the anode side of the membrane and the cathode side electrocatalyst layer in the cathode side thereof respectively.

Formation of Electrode Bonded Assembly

After preparing the anode side electrode bonded assembly and cathode side electrode bonded assembly as aforementioned, they were faced to each other with the electrocatalyst layers being faced. The solid polymer electrolyte membrane was sandwiched between the anode and cathode side bonded assemblies and was bonded thereto. Then, this assembly was pressed with a press tool and subjected to a hot press process at about 155° C. with about 25 kgf/cm$^2$ to form a solid polymer electrolyte membrane electrode bonded assembly according to the present invention.

(Comparative Example of a Solid Polymer Electrolyte Membrane Electrode Bonded Assembly)

Comparative example of the solid polymer electrolyte membrane electrode bonded assembly is provided with single electrocatalyst layers in both cathode and anode electrodes.

In order to form the electrocatalyst layer, the same PTFE dispersed solution as the above embodiment was prepared. In this case, a platinum loading carbon black (20 weight % Pt/C) 160 mg was mixed with PTFE dispersed solution including 55 weight % PTFE(TEFLON FEP120-J) 158 mg. Next, the solution was sprayed on the semi-fabricated product to form the electrocatalyst layer in the same manner as aforementioned. About 15–20 weight % of the total spray amount was retained on the surface. Then, the same sintering process is applied. The rest of the process for preparing the electrode assembly was the same as the present invention.

Then, power generating experiment was conducted using the fuel cells according to the present invention and comparative example.

Through the experiment, it was found that the fuel cell according to the present invention showed a remarkable result compared with that of the comparative example that a generated voltage of the present invention is higher than comparative example by as much as approximately 50 mV under a condition of about 500 mA/cm² of current density. This means that the present invention improve the power generation efficiency by about as high as 60%–65%, comparing with the conventional one. It is apparent that since, the result is based on only a single solid polymer electrolyte electrode bonded assembly, in case of a multiple structured fuel cell, the improvement in the power generating efficiency is more remarkable. Meanwhile, in the illustrated embodiment, the electrocatalyst layer in the cathode electrode is constituted by two layers with different catalyst densities. However, it should, be noted that more layers can be employed with different catalyst densities. In this case, the catalyst layers are formed or laminated in a way that the catalyst density is increased toward the electrolyte membrane. Further, in the illustrated embodiment, the anode electrode has a single and uniform catalyst density. However, this is not a constraint. Rather, it is preferable that the anode catalyst layer may be of plural different catalyst densities as well as the cathode side catalyst layers. Further, the catalyst layer is not necessarily constituted by plural laminated layers. A single catalyst layer with a catalyst density gradient reducing from the electrolyte to the diffusion layer can be effectively used. Further, in preparation of the catalyst layer, any known means can be employed instead of a spray, brush provided that about 10–100 micro meter membrane can be formed with, preferably, the above catalyst density gradient.

According to the present invention, a power generation efficiency can be remarkably improved with a simply structure and advantageous cost performance in the field of a solid polymer electrolyte fuel cell.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A solid polymer electrolyte fuel cell including
   (a) a solid polymer electrolyte membrane having two sides,
   (b) an anode electrode having two sides with one of the sides bonded to one side of the polymer electrolyte membrane,
   (c) a cathode electrode having two sides with one of the sides bonded to the other side of the polymer electrolyte membrane,
   (d) said cathode electrode comprising
      (i) an electrocatalyst layer on said one side of said cathode electrode composed of platinum loading carbon black particles sintered together with a binder,
      (ii) said one side of said electrocatalyst layer having a surface portion,
      (iii) an electrocatalyst membrane composed of platinum loading carbon composite formed on said surface portion of said electrocatalyst layer,
   (e) said surface portion of said electrocatalyst layer being bonded to the other side of the polymer electrolyte membrane with said electrocatalyst membrane interposed therebetween.

2. A solid polymer electrolyte fuel cell according to claim 1 wherein the said electrocatalyst membrane is less than about 1 $\mu$m thick.

3. A solid polymer electrolyte fuel cell according to claim 1 wherein the density of platinum in said electrocatalyst membrane is at least 0.01 mg/cm².

4. A solid polymer electrolyte fuel cell according to claim 1 wherein the density of platinum in said electrocatalyst membrane is from about 0.01 to about 0.1 mg/cm².

5. A solid polymer electrolyte fuel cell according to claim 4 wherein the density of platinum in said electrocatalyst membrane is from about 0.03 to about 0.07 mg/cm².

6. A solid polymer electrolyte fuel cell according to claim 1 wherein said surface portion of said electrocatalyst layer is porous and platinum loading carbon composite is bonded in the electrocatalyst layer up to a depth of about 5 $\mu$m.

7. A solid polymer electrolyte fuel cell according to claim 1 wherein the density of platinum in said electrocatalyst layer is from about 0.30 to about 0.40 mg/cm².

8. A solid polymer electrolyte fuel cell according to claim 7 wherein the density of platinum in said electrocatalyst layer is about 0.35 mg/cm².

9. A method for preparing a solid polymer electrolyte fuel cell which includes the steps of;
   (a) bonding a surface of an anode electrode to one side of a polymer electrolyte membrane having two sides,
   (b) establishing a cathode electrode comprising (i) an electrocatalyst layer on one side of said cathode electrode composed of platinum loading carbon black particles sintered together with a binder, (ii) said electrocatalyst layer having a surface portion, (iii) forming an electrocatalyst membrane composed of platinum loading carbon composite on said surface portion, and
   (c) bonding said cathode electrode to the other side of said solid polymer electrolyte membrane with said surface portion of said electrocatalyst layer bonded to the other side of the polymer electrolyte membrane with said electrocatalyst membrane interposed therebetween.

10. A method for preparing a solid polymer electrolyte fuel cell according to claim 9 wherein said electrocatalyst membrane has a thickness of less than about 1 $\mu$m.

11. A method for preparing a solid polymer electrolyte fuel cell according to claim 9 wherein the electrocatalyst membrane is formed by sputtering.

12. A method for preparing a solid polymer electrolyte fuel cell according to claim 9 wherein the density of platinum in said electrocatalyst membrane is at least 0.01 mg/cm².

13. A method for preparing a solid polymer electrolyte fuel cell according to claim 12 wherein the density of platinum in said electrocatalyst membrane is from about 0.01 to about 0.1 mg/cm².

14. A method for preparing a solid polymer electrolyte fuel cell according to claim 13 wherein the density of platinum in said electrocatalyst membrane is from about 0.03 to about 0.07 mg/cm².

15. A method for preparing a solid polymer electrolyte fuel cell according to claim 9 wherein platinum loading carbon composite is bonded in said surface portion of said electrocatalyst layer up to a depth of about 5 $\mu$m.

16. A method for preparing a solid polymer electrolyte fuel cell according to claim 9 wherein the density of platinum in said electrocatalyst layer is from about 0.30 to about 0.40 mg/cm².

17. A method for preparing a solid polymer electrolyte fuel cell according to claim 16 wherein the density of platinum in said electrocatalyst layer is about 0.35 mg/cm².

* * * * *